United States Patent
Bos et al.

(10) Patent No.: US 7,027,818 B2
(45) Date of Patent: Apr. 11, 2006

(54) METHOD, TELECOMMUNICATION FRAMEWORK NETWORK AND USER EQUIPMENT FOR PROVISIONING OF SUBSCRIBED QUALITY OF SERVICE GUARANTEES TO SUBSCRIBERS OF A NETWORK WHEN THEY HAVE TO COMMUNICATE BY MEANS OF ANOTHER NETWORK

(75) Inventors: Lieve Maria Marcella Rosemarijn Bos, Vlimmeren (BE); Suresh André Jean-Marie Leroy, Vlimmeren (BE)

(73) Assignee: Alcatel, Paris (FR)

( * ) Notice: Subject to any disclaimer, the term of this patent is extended or adjusted under 35 U.S.C. 154(b) by 640 days.

(21) Appl. No.: 10/118,905

(22) Filed: Apr. 10, 2002

(65) Prior Publication Data
US 2002/0151312 A1 Oct. 17, 2002

(30) Foreign Application Priority Data
Apr. 11, 2001 (EP) ................... 01400932

(51) Int. Cl.
*H04Q 7/20* (2006.01)
(52) U.S. Cl. ............... 455/452.2; 455/445; 455/435.1; 370/229; 370/252; 370/253
(58) Field of Classification Search ............. 455/452.1, 455/452.2, 434, 445, 435.1; 709/230; 370/229, 370/252, 253
See application file for complete search history.

(56) References Cited

U.S. PATENT DOCUMENTS 5,915,220 A 6/1999 Chelliah
2002/0147824 A1* 10/2002 Hurtta et al. ............... 709/230

FOREIGN PATENT DOCUMENTS

| DE | 199 41 337 A1 | 3/2001 |
|---|---|---|
| EP | 0 946 008 A2 | 9/1999 |
| WO | WO 96/18273 | 6/1996 |

OTHER PUBLICATIONS

G. P. Eleftheriadis et al, "User Profile Identification in Future Mobile Telecommunications Systems"—IEEE Netowrk, Sep./Oct. 1994, pp. 33-39, XP 000606584.
Eleftheriadis G P. et al.: "User Profile Identification in Future Mobile Telecommunications Systems" IEEE Network, IEEE Inc. New York, US, vol. 8, No. 5, Sep. 1, 1994, pp. 33-39, XP000606584.

* cited by examiner

Primary Examiner—William Trost
(74) Attorney, Agent, or Firm—Sughrue Mion, PLLC

(57) ABSTRACT

In a framework of networks including at least a service policy decision point S-PDP (4), a network resource policy decision point NR-PDP (8), a user resource policy decision point UR-PDP (14), a P-CSCF or S-CSCF (13 or 7), a SGSN (12), and a GGSN (11), the method includes the following steps:

transmitting the characteristics corresponding to the qualities of service QoS as provided for in a home network (2) to a visited network (3);
extending the SIP/SDP messages to pass QoS characteristics related to a user, between a home network S-CSCF (7) and a visited network P-CSCF (13) or between a user equipment (15) and a visited network P-CSCF (13);
using QoS received for a user calling from visited network (3), to enforce a visited network resource policy consolidated with the home network service policy, in the visited network during a multimedia communication session.

8 Claims, 1 Drawing Sheet

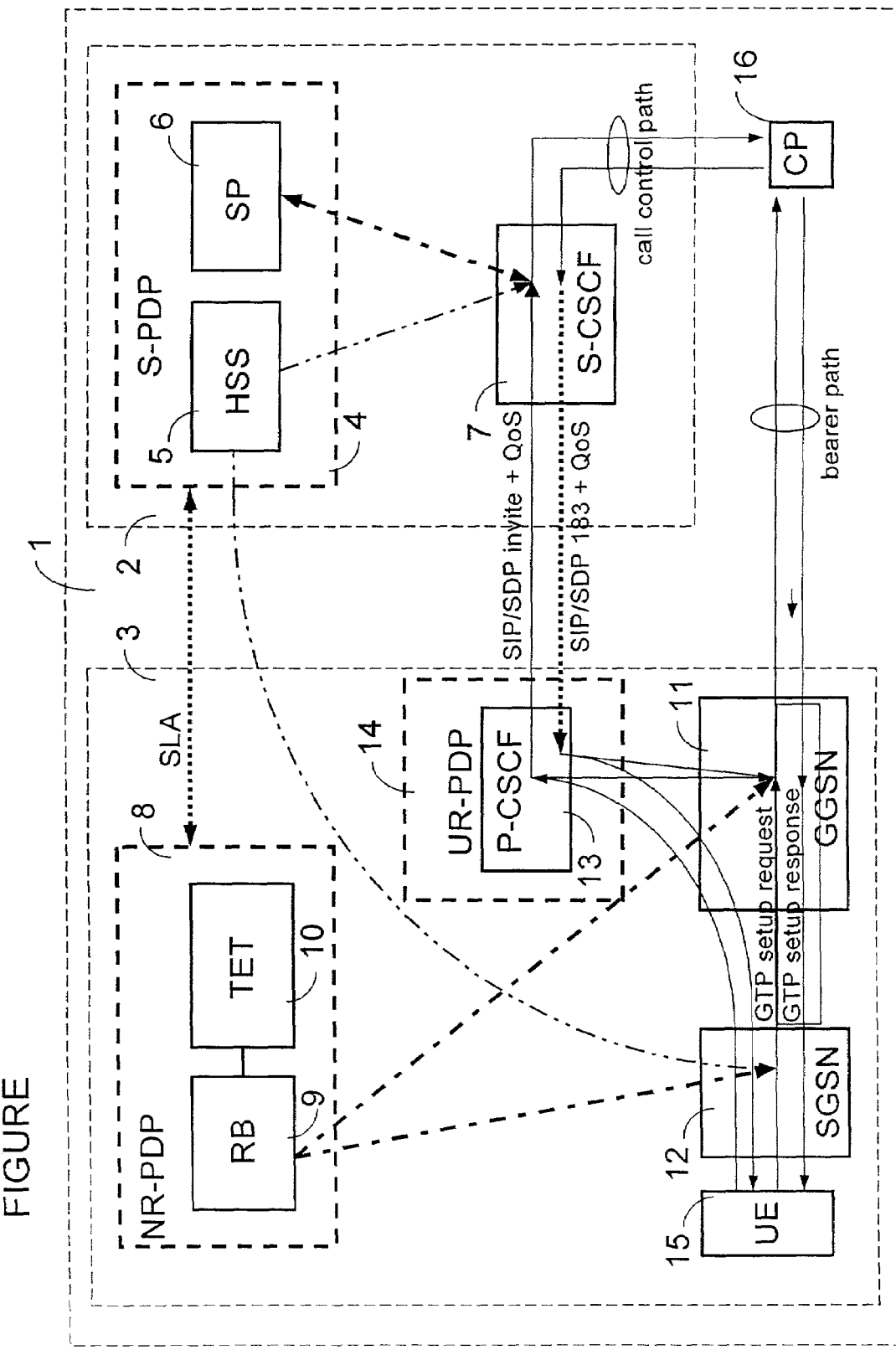
FIGURE

METHOD, TELECOMMUNICATION FRAMEWORK NETWORK AND USER EQUIPMENT FOR PROVISIONING OF SUBSCRIBED QUALITY OF SERVICE GUARANTEES TO SUBSCRIBERS OF A NETWORK WHEN THEY HAVE TO COMMUNICATE BY MEANS OF ANOTHER NETWORK

BACKGROUND OF THE INVENTION

The present invention relates to a method for provisioning of subscribed Quality of Service or QoS guarantees for multimedia services to a user in a framework of telecommunication networks when this user communicates from a network different from his home network. It also relates to a telecommunication network for a framework of networks in which common rules are followed, such as, for instance, the Universal Mobile Telecommunication System UMTS. It also relates to user equipment that communicates with a Proxy Call State Control Function P-CSCF in the network from which it is either calling or called, by means of extensions of Session Initiation Protocol SIP/Session Description Protocol SDP messages for the handling of multimedia components in accordance with Quality of Service QoS requirements for a call corresponding to a multimedia communication session.

As known, multimedia systems offer services with much more Quality of Service QoS variants than the classical circuit switched networks. Therefore, it is one of the major objectives of multimedia telecommunication systems, such as UMTS Release 5, to provide services corresponding to different needs with appropriate resource allocations. Accordingly, the user expects and requests a proper end-to-end Quality of Service for every service for which he has a subscription with his home network even when such a service has to be provided by other networks associated with his home network in a telecommunication framework. Taking UMTS as an example of the telecommunication framework, the "home network" is the network with which the user made his initial service subscription, the "visited network" is the network to which the roaming user is currently attached. It is clear that when the user is not roaming outside its home network, in that case the visited network is equal to the user's home network.

Right now, network operators can define service policies for their respective networks. These service policies, defining the rules by which the operator will allow users access to his services, are detailed in the user's service profile, which is negotiated between the home operator and the users, via subscription. Each operator enforces his own service policies on his own network, via his own service policy control mechanisms. Network operators can also define resource policies for their respective networks. Resource policies define the rules that a network operator uses to authorize requests to use his transport/bearer resources. Each operator enforces his own resource policies on his own network, via his own resource policy control mechanisms. Policy control mechanisms, such as Common Open Policy Service protocol COPS of the Internet Engineering Task Force IETF, provide means to network operators for enforcing local policies in their respective networks from a Policy Decision Point PDP onto a Policy Enforcement Point PEP.

As known, Next Generation Networks NGN, are packet based networks employing new multimedia call control, management and signaling protocols, e.g., SIP/SDP or H.323, to provide from narrow-band voice telephony services to broadband multimedia services to users and particularly with users requesting qualities of service and particularly transmission bandwidths well adapted to their needs.

3GPP has decided to use a Session Initiation Protocol/Session Description Protocol SIP/SDP suite as the single call control protocol suite for the UMTS R5 multimedia domain. In the SIP/SDP protocol suite, SIP messages are used for multimedia call control signaling between end parties, i.e., the calling or called party user equipment or terminal, and intermediate SIP call control nodes, which are called CSCF in UMTS. SDP offers the possibility to attach additional information fields to a SIP message containing a more detailed description about the session's multimedia components. This invention relates to extensions to the SIP/SDP suite used for transmitting user perceived Quality of Service QoS characteristics. It has to be remarked that, this invention only discusses, but is not limited to, QoS extensions to SIP/SDP. H.323 is another protocol suite used for multimedia call control in the fixed world. Consequently, although only QoS extensions to SIP/SDP are described as a preferred example in this invention, similar QoS extensions could equally be applied to other present, such as H.323, or even future multimedia protocol suites.

Although this invention uses as preferred example the UMTS SIP/SDP multimedia architecture, which is based on SIP call control elements called Call State Control Functions CSCF, it could equally apply to other multimedia call control architectures, e.g., the H.323 architecture whose call control elements are called H.323 Gate Keepers.

Similarly GPRS, the bearer system for 3GPP UMTS networks, is only used as a preferred example in this invention. The invention equally applies to other bearer networks, such as Asymmetric Digital Subscriber Line ADSL used in NGN networks.

In Next Generation Networks NGN, there is a split between bearer control and call control, meaning that call control signaling can follow a totally different route than the bearer path. In UMTS, as an example of such a NGN network, bearer control comprises Generic Packet Radio System GPRS elements, such as Serving GPRS Support Node SGSN and Gateway GPRS Support Node GGSN, and call control comprises Session Initiation Protocol SIP call control elements, more specifically Proxy Call State Control Function P-CSCF and Serving Call state Control Function S-CSCF. In UMTS, the bearer path goes via SGSN and GGSN, both located in the visited network, directly towards its destination. The call control path goes from the P-CSCF, located in the visited network, first via the S-CSCF in the home network, before going towards its destination.

In UMTS service policy control is enforced by the home network from a PDP, coupled to the Service Platform SP or Home Subscriber Server HSS, onto a PEP, coupled to the Serving Call State Control Function S-CSCF. Resource policy control is enforced by the visited network from a PDP, coupled to the Proxy Call State Control Function P-CSCF, onto a PEP, coupled to the Gateway GPRS Support Node GGSN. As the SIP/SDP call control always pass through a S-CSCF in the home network, whereas the bearer path always goes directly from the GGSN in the visited network to its destination, it is clear that therefore, service policy control which is under control of home network, and resource policy control which is under control of visited network, are completely uncorrelated. Accordingly, if there is a local network failure or overload situation in the visited network, there is no possibility of having any service information from the home network taken into account in the visited network for a visiting user, when a downgrading of quality of service is enforced for users visiting this visited network. So currently there is no way for home operators to give their customers guarantees that a high Quality of Service, according to the subscription paid for by the user, can be maintained when the user communicates by means of a visited network, even if such a maintaining would be desirable in the present situation.

SUMMARY OF THE INVENTION

An aspect of the present invention is, therefore, to provide a method for a telecommunication framework of networks according to which a correlation between service and resource policy controls is insured and service requirements, e.g., related to Qualities of Service, corresponding to subscriptions paid for by users to their home networks are transmitted to visited networks in order to be taken in account, if necessary. Such a case happens for instance if there is a disturbance, such as a local network failure or an overload. The knowledge, at the level of a network from where a visiting user has called, of the Quality of Service attributed to this user in his home network could permit keeping conditions adapted, and if possible identical, to those previously in force, if there is a traffic disturbance affecting the call in the visited network.

The method according to the present invention, is for provisioning of subscribed quality of service guarantees and more particularly those related to the handling of multimedia components to registered users in a framework of telecommunication networks with common rules, such as UMT-S or non-UMTS NGN networks, when a user is engaged in a multimedia communication provided from a network different from his home network in which he is registered. It applies in a framework of telecommunication networks including each at least a service policy decision point, a network resource policy decision point, a user resource policy decision point, a call state control function, i.e., a P-CSCF or S-CSCF, a service GPRS support node, i.e., a SGSN, and a gateway GPRS support node, i.e., a GGSN.

According to the present invention, the method implies the following steps:

transmitting the characteristics corresponding to the respective qualities of service QoS as provided for in a first network to at least another network in the framework, either by off-line or on-line contract negotiation between networks, when or as soon as there is a call or a possibility of call from the said another, or visited, network by a user having the first network as home network;

extending the Session Initiation Protocol SIP/Session Description Protocol SDP messages transmitted between a serving call state control function S-CSCF in a first network and a proxy call state control function P-CSCF in another network, when a user, having the first network as home network, is calling from the said another network, to pass the quality of service QoS, as allowed to, requested by and/or subscribed by the calling user, from his home network to the said another network which is considered as visited, with the SIP/SDP extensions for QoS relating possibly to the entire call control signaling chain;

using the quality of service QoS received from a home network of a determined user by the proxy call state control function of another network, for a call session initiated by this determined user from said another network, to enforce a proper resource policy consolidated with the service policy of the said home network, in the visited network during the whole multimedia communication, or call, session.

The invention also proposes a telecommunication network, for a framework as defined above, which comprises:

means for transmitting characteristics corresponding to the respective qualities of service QoS, as provided for its registered home users, to at least another network in the framework, either by off-line or on-line contract negotiation between networks, when or as soon as there is a call or a possibility of call by one of this registered users, from the said visited network;

means for extending the Session Initiation Protocol Session Description Protocol or SIP/SDP messages transmitted between a home network call state control function S-CSCF that it comprises and a call state control function P-CSCF in another network such as a visited network to pass, between networks, Quality of Service QoS characteristics for a user as specified in the user's subscription with his home network, with the SIP/SDP extensions for QoS relating possibly to the entire call control signaling chain between the respective equipments of the calling and called users;

means for using the quality of service QoS received from a home network for a determined visiting user for a multimedia session initiated by the said determined user, to enforce a proper resource policy consolidated with the service policy of the said home network, during a whole multimedia communication session.

The invention also relates to a user equipment for a network included in a communication framework as indicated above, which is characterized in that it comprises means for communicating with P-CSCF function in the network from which it is either calling or called, by means of extensions of SIP/SDP messages for the handling of multimedia components in accordance with QoS requirements for a call corresponding to a multimedia communication session.

These and other aspects, advantages and features of the invention will become apparent from the following description thereof taken in conjunction with the accompanying FIGURE, which illustrates a specific embodiment of the present invention.

BRIEF DESCRIPTION OF THE DRAWINGS

The FIGURE is a block diagram showing the main elements of interlinked telecommunication networks involved in the method, according to the invention, for provisioning of subscribed quality of service guarantees to users in a telecommunication framework. It is preferred for this particular embodiment to describe a Universal Mobile Telecommunication network UMTS. They can also be non-UMTS NGN networks allowing communications between fixed users with for instance one user having a portable terminal, such as a laptop computer, connected abroad to a visited telephone network different from the home telephone network having this user as a subscriber.

DETAILED DESCRIPTION OF THE INVENTION

As known, UMTS characteristics are found in technical specifications, such as 3GPP TS 23.228 v1.7.0 "IP Multimedia Sub-System Stage 2", TS 23.002 v5.1.0 "Network Architecture Release 5", TS 23060 v3.5.0 "General Packet Radio Service", TS 23107 v4.0.0 "QoS concepts and Architecture Release 1999", as well as IETF rfc 2543 "SIP: Session Initiation Protocol" and IETF rfc 2327 "SDP: Session Description Protocol".

A telecommunication framework 1 including at least two interlinked and interworking telecommunication networks 2 and 3 is shown on the FIGURE. A telecommunication network as foreseen above has registered users having subscribed for different narrow-band and/or multimedia services as proposed by the network operator. Choices of services are obtained according to service profiles corresponding to subscription schemes. Service characteristics corresponding to a determined Quality of Service QoS, which specify the perceived quality of each service as experienced by the user, in relation with his subscription scheme and service profile, are guaranteed to a user when communicating by means of his home network where he is registered as a subscriber. The way the QoS service characteristics are defined is not specified in full detail in this invention in order to leave open the possibility for operators to use innovative subscription schemes as a differentiation factor towards competitors. Just to give an illustration, the QoS service characteristics could for instance specify the QoS guarantees as perceived by the user on a multimedia component level and per session. Service Level Agreements SLA are passed between operators having networks, such as 2 and 3, interlinked inside of a same telecommunication framework, such as 1, in order to have their respective users benefiting of service profiles corresponding to their respective subscriptions, when they access from another network outside of their respective home networks in the telecommunication framework. As known an unshown backbone of one or several intermediate telecommunication networks links two telecommunication networks, such as 2 and 3, in the framework, if they are not directly interconnected by means of point-to-point links.

As already known, an UMTS network and for instance an UMTS terrestrial access network UTRAN includes a sub-system broadly similar to a GSM base station sub-system. It comprises intelligent transceiver units or Node B units, corresponding to the GSM base station transceivers BTS for communication with mobile terminals. Radio Network Controllers RNC control the radio links established with the mobile terminals in the network, they are connected to the UMTS core network, which corresponds broadly to GSM/GPRS core networks. Such a UMTS core network is divided in domains, with a service domain, a packet switched domain, an Internet protocol IP Multimedia domain and/or a circuit switched domain. A Home Subscriber-Server HSS and a Service Platform SP are also included in an UMTS network.

Radio network controllers are linked to units of the packet switched domain and provide, for instance, packet-switched connectivity services to Internet users. Such units comprise a Serving GPRS Support Node SGSN and a Gateway GPRS Support Node GGSN. GGSN units are linked to subs-systems in the IP Multimedia domain and particularly at the level of a Call State Control Function CSCF.

As shown on the FIGURE, a Service Policy Decision Point S-PDP 4 is provided for in a home network such as 2, it comprises a Home Subscriber Server HSS, referenced 5, and a Service Platform SP 6. As known, such a service platform includes, for instance, a Service Control Point SCP for providing Intelligent Network IN based services and an Application Server AS for providing Open Service Architecture OSA based services. Multimedia subscriber data are downloaded from the HSS 5 to a Serving Call State Control Function S-CSCF 7, also located in the home network, at registration time. There is also a functional link for service policy control between this S-CSCF 7, which corresponds to Service Policy Enforcement Point PEP, and the Service PDP 4.

A link for Service Level Agreement SLA is provided between a home network, such as 2 and a visited network, such as 3. It links the S-PDP 4 in the home network 2 to a Network Resource Policy Decision Point NR-PDP 8 in the visited network 3. This NR-PDP 8 includes, for instance, a Resource Broker RB 9 and a Traffic Engineering Tool TET 10.

Resource Broker 9 is a problem solver applying rules and more specifically resource policy rules defined by the visited-network manager and it elaborates a network resource policy which is enforced by means of the GGSN 11 and SGSN 12, both functioning as Network Resource PEP. TET 10 provides information to RB 9 from practically all the network units, when there are traffic problems occurring somewhere in network 3. GGSN 11 and SGSN both correspond to policy enforcement points for the enforcement of network resource policy as provided by NR-PDP 8, GGSN 11 also corresponds to a policy enforcement point for the enforcement of user resource policy as provided by the User Resource Policy Decision Point UR-PDP. The UR-PDP is coupled to the Proxy Call State Control Function P-CSCF 13 in the visited network 3. The P-CSCF 13 communicates, via a call control signaling protocol such as SIP/SDP, with S-CSCF 7 acting as a service PEP in home network 2.

According to the invention, a method for provisioning of subscribed Quality of Service QoS guarantees to users in a framework of interworking telecommunication networks with common rules implies a transmission of QoS characteristics between networks. The characteristics corresponding to the QoS provided to the users registered as subscribers in their home network 2 are sent to other networks of the same telecommunication framework, such as the visited network 3 in which the subscriber of home network 2 is roaming. These characteristics are, for instance, communicated from a network to another in the framework, in accordance with a Service Level Agreement SLA as symbolized on the FIGURE. As known, a SLA specifies certain parameters of job performance and execution between contractors, such as networks, to ensure that job streams involving these contractors are executed successfully. In the present case, the characteristics of the QoS for a network are communicated to another network, as the result of either off-line or on-line negotiation, when or as soon as there is a call (on-line or a possibility of call (off-line from one of the two networks, e.g., at the time the roaming agreements between the networks of the telecommunication framework were established by a visiting user having the other network as his home network. Accordingly, means are provided in the involved telecommunication framework networks for transmitting information from one to the other, according to known transmission techniques.

A step and means are also provided for extending the SIP/SDP messages to pass allowed and/or subscribed and/or requested Quality of Service QoS characteristics as perceived by a user (e.g., the QoS guarantees related to the handling of multimedia components as specified in the user's subscription with his home network). One application would be to use the SIP/SDP extension between a home network S-CSCF 7 in the home network 2 and a P-CSCF 13 in the visited network 3 with the purpose to link home network service policy with visited network resource policy. Another application would be to use the SIP/SDP extension between the user equipment 15 and the P-CSCF 13 in the visited network with the purpose to allow the user to request a Quality of Service per multimedia component and per session other than the standard QoS specified in its subscription profile.

As illustrated on the FIGURE, such a SIP/SDP message from the home network to the visited network is sent from the S-CSCF 7 of the home network 2 to a P-CSCF 13 in the visited network 3.

A third step and other means are also provided to use the QoS information, which was transferred via the extended SIP/SDP message to enforce a proper resource policy in a visited network, this resource policy being consolidated with the service policy of the home network of a user calling from the visited network, during the whole call session. This consolidation takes in account QoS affected to this calling user, as received from his home network.

It is assumed now that there is a roaming user which is a subscriber having network 2 as a home network, and which intends to communicate by means of a User Equipment UE 15 in a visited network 3. As already known, when, for instance, this user initiates a call for a determined multimedia service, he sends a first SIP/SDP INVITE message to P-CSCF 13, through SGSN node 12 and GGSN node 1 in visited network 3. P-CSCF 13 determinates that the SIP/SDP INVITE is not from a user that is a subscriber of network 3, and accordingly it forwards this SIP/SDP INVITE to have it taken in account by S-CSCF 7 in the home network 3 of the calling user.

The S-CSCF 7 checks the rights allowed to the calling user in his home network 2, in accordance with information obtained in this home network in relation with service policy decision point S-PDP 4. For this purpose, Multimedia subscriber data corresponding to the user are downloaded from HSS 5 as suggested by double dot and dash line to S-CSCF 7 on the FIGURE. There are also information exchanges between S-PDP 4 and S-CSCF 7, as suggested for instance by dot and dash line between SP 6 and S-CSCF 7. GPRS subscriber data are also downloaded from server HSS 5 to node SGSN 12 in visited network 3.

If the service request, included in the SIP/SDP INVITE, from the calling user is considered as correct by its home S-CSCF 7, the SIP/SDP INVITE is sent to the user equipment of the Called Party CP 16, which is supposed to be presently located somewhere in telecommunication framework 1. The SIP/SDP INVITE is taken in account at the CP user equipment 16, to check if means for enforcing the set-up requested for the call by the calling user are available at the CP level, for instance multimedia means (e.g., codec) corresponding to those operative at the level of calling user equipment 15. A so-called SIP/SDP 183 message is sent back to the calling user equipment UE 15, from the called user equipment CP 16. It is transmitted through S-CSCF 7 of the home network of the calling user, and P-CSCF 14, node GGSN 11, node SGSN 12 of the visited network. According to the invention, an indication defining the user perceived Quality of Service QoS, attributed to the calling user in his home network 2 according to his subscription, is added to the SIP/SDP 183 message from S-CSCF 7 in the home network 2 to P-CSCF 14 in visited network 3, for recording.

If there is no possibility of obtaining the set-up requested by the calling user, a negotiation is made between calling and called party to reach an agreement for the SIP multimedia communication session that they intend to have. This is done under control of P-CSCF 14, being coupled to the user resource policy decision point for the visited network, and of S-CSCF 7, being coupled to the service policy decision point for the home network of the calling user.

When an agreement via SIP call control signaling is reached, calling user equipment UE 15 tries to set up a data path to the called party CP 16, according to the agreed requirements. The first part of this data path, between calling user equipment UE 15 and GGSN 11 via SGSN 12, is established by UE 15 by using a GTP or GPRS Tunnelling Protocol set-up request. If GGSN 11 finds that the GTP tunnel set-up request was set-up correctly, and in accordance with the resource policy information it contains from UR-PDP 14 and NR-PDP 8, it allows the data path set-up to continue from GGSN 11 towards the called party CP 16. When a data path with the correct requirements can be set-up, a GTP set-up response is established towards UE 15 through GGSN and SGSN nodes 11 and 12 of visited network 3 according to GTP protocol, in the same way as the tunnel in the opposite direction, this GTP tunnels being illustrated on the FIGURE.

If some disturbance occurs in the visited network 3, such as for instance a traffic overload or a failure, there is not always a possibility of having the same QoS, as defined in the set-up profile session at the beginning of this multimedia session and as in force before for the preceding part of the session between calling and called parties.

However, the QoS characteristics for every visiting user, having a multimedia session in force in visited network 3, have been received at the level of P-CSCF 13 in the UR-PDP 14 of this visited network. Consequently, it can be used when there is a policy from the NR-PDP 8 to be enforced.

NR-PDP 8 of visited network 3 has recorded or received information from the S-PDP of every network, such as 2, being a home network of a user having a call in force in visited network 3. This is done or has been done under an off-line or on-line agreement SLA and NR-PDP 8 of the visited network 3 has the knowledge of all the characteristics corresponding to the respective QoS in these user home networks 2.

Resource Broker RB 9 of visited network 3 gets such information as well as information about all the visited network units provided by means of Traffic Engineering Tool TET 10. It provides a network resource policy adapted to the problem as laid upon by the disturbance and it has it enforced by means of GGSN and SGSN nodes 11 and 12. Such an enforcement at the level of GGSN node 11 is consolidated with the service policy of the home network of every visiting user in visited network 3 having requested a multimedia session which is then in force as UR-PDP 14, which is coupled to P-CSCF 13, has received the respective QoS characteristics for each of these visiting users.

The invention claimed is:

1. A method for provisioning of subscribed quality of service (QoS) guarantees related to the handling of multimedia components to users in a framework of telecommunication networks with common rules when a user registered in his home netowrk has to call from a visited network, each network comprising a service policy decision point, a network resource policy decision point, a user resource policy decision point, a call state control function, a service GPRS support node, and a gateway GPRS support node, said method comprising:

transmitting subscribed QoS characteristics specified in a subscription profile of said user as provided for in the service policy decision point of the home network to the service GPRS support node and a serving call state control function in the framework by transmitting Session Initiation Protocol (SIP)/Session Description Protocol (SDP) messages between a serving call state control function of said home network and a proxy call state control function of said visited network; and transmitting user perceived QoS characteristics requested by the user per multimedia component and per session, said user perceived QoS characteristics being other than said subscribed Quality of Service QoS characteristics, said user perceived QoS characteristics being transmitted by extending the SIP/SDP messages transmitted between said user calling from said visited network via a serving call state control function in said home network and a proxy call state control function in said visited network.

2. The method according to claim 1, wherein said method comprises transmitting the user perceived QoS characteristics, as allowed by rules controlling the operation of said serving call state control function of said home network and the operation of said proxy call state control function of said visited network, with said extended SIP/SDP messages relating to at least a portion of the call control signaling chain between said calling user and said called user.

3. The method according to claim 2, wherein said user perceived QoS characteristics are used to enforce resource policy in said visited network consolidated with the service policy of said home network during a call corresponding to a multimedia communication session.

4. The method according to claim 1, wherein said visited network is said home network.

5. A telecommunication network comprised of interworking telecommunication networks having common rules, each network comprising a service policy decision point, a network resource policy decision point, a user resource policy decision point, a call state control function being at least one of a proxy call state control function and a serving call state control function, a service GPRS support node and a gateway GPRS support node, said telecommunication network comprising:

means for transmitting subscribed Quality of Service (QoS) characteristics specified in the subscription profile of a user provided for in the service policy decision point of a home network wherein said user is registered, to said service GPRS support node and said serving call state control function in the framework, when or as soon as there is a call or a possibility of call by said user from said visited network, wherein said subscribed QoS characteristics are transmitted between the serving call state control function of said home network and the proxy call state control function of said visited network by Session Initiation Protocol (SIP)/Session Description Protocol (SDP) messages, means for extending said SIP/SDP messages with user perceived QoS characteristics requested by the user per multimedia component and per session, said user perceived QoS characteristics being other than said subscribed QoS characteristics, and means for transmitting said extended SIP/SDP messages between a user calling from said visited network to a called user via the proxy call state control function of said visited network and the serving call state control function of said home network.

6. The telecommunication network according to claim 5, wherein said means for extending and transmitting the messages allowed by rules controlling the operation of said serving call state control function of said home network and the operation of said proxy call state control function of said visited network, with said extended SIP/SDP messages relating to at least a portion of a call control signaling chain between the calling user and the called user.

7. The telecommunication network according to claim 6, wherein said telecommunication network further comprises means for using said user perceived QoS characteristics to enforce a resource policy in the visited network consolidated with the service policy of said home network during a call corresponding to a multimedia communication session.

8. The telecommunication network according to claim 5, wherein said telecommunication network further comprises means for communicating with said proxy call state control function of said visited network from which a user is calling or is called by using said extended SIP/SDP messages related to the handling of multimedia components in accordance with QoS characteristics requirements for a call corresponding to a multimedia communication session.

* * * * *